United States Patent
Mullins et al.

(10) Patent No.: US 11,458,572 B2
(45) Date of Patent: Oct. 4, 2022

(54) LASER SMOOTHING

(71) Applicant: Caterpillar Inc., Deerfield, IL (US)

(72) Inventors: Paul S. Mullins, Corinth, MS (US); Jeffery M. Stark, Corinth, MS (US)

(73) Assignee: Caterpillar Inc., Peoria, IL (US)

( * ) Notice: Subject to any disclaimer, the term of this patent is extended or adjusted under 35 U.S.C. 154(b) by 555 days.

(21) Appl. No.: 16/414,644

(22) Filed: May 16, 2019

(65) Prior Publication Data

US 2020/0361034 A1 Nov. 19, 2020

(51) Int. Cl.
*B23K 26/34* (2014.01)
*B33Y 10/00* (2015.01)
*B23K 26/354* (2014.01)

(52) U.S. Cl.
CPC ............ *B23K 26/34* (2013.01); *B23K 26/354* (2015.10); *B33Y 10/00* (2014.12)

(58) Field of Classification Search
CPC ......... B33Y 30/00; B33Y 10/00; B33Y 50/02; B33Y 80/00; B33Y 40/00; B33Y 70/00; B33Y 50/00; B23K 26/342; B23K 26/0604; B23K 26/06; B23K 26/0608; B23K 26/34; B23K 26/364; B23K 26/40; B23K 26/082; B23K 26/0823; B23K 26/144; B23K 26/354; B23K 26/032; B23K 26/034; B23K 26/0626; B23K 26/067; B23K 26/1462; B23K 26/32; B23K 26/0006; B23K 26/0093; B23K 26/0736; B23K 26/0884; B23K 26/10; B23K 26/123; B23K 26/127; B23K 26/146; B23K 26/60; B23K 26/702; B23K 26/0342; B23K 26/04; B23K 26/044; B23K 26/046; B23K 26/062;
(Continued)

(56) References Cited

U.S. PATENT DOCUMENTS 9,930,798 B2 3/2018 Browning et al.
10,067,494 B2 9/2018 Chen et al.
(Continued)

FOREIGN PATENT DOCUMENTS

CN 102021561 7/2012
CN 103498154 1/2014
(Continued)

OTHER PUBLICATIONS

English translation of CN-109226755-A (Year: 2019).*
(Continued)

*Primary Examiner* — Chris Q Liu
(74) *Attorney, Agent, or Firm* — Schwegman, Lundberg & Woessner

(57) ABSTRACT

A method of additive manufacturing includes providing a substrate material at a location proximate a surface of a part and forming the substrate material into an additive layer on top of the surface by exposing the substrate material to a first laser beam having a first power level. After forming the additive layer on the part, the method includes cooling at least a portion of the additive layer from a first temperature reached at the completion of the forming step to a second temperature. After cooling, the method includes exposing the additive layer to a second laser beam having a second power level, wherein the second power level is lower than the first power level.

11 Claims, 5 Drawing Sheets

(58) Field of Classification Search
CPC ............ B23K 26/0622; B23K 26/0624; B23K 26/064; B23K 26/0643; B23K 26/0648; B23K 26/0676; B23K 26/0738; B23K 26/0869; B23K 26/0876; B23K 26/1224; B23K 26/125; B23K 26/14; B23K 26/142; B23K 26/1464; B23K 26/16; B23K 26/211; B23K 26/244; B23K 26/355; B23K 26/356; B23K 26/3576; B23K 26/361; B23K 26/38; B23K 26/402; B23K 26/53; B23K 26/703; B23K 26/704; B23K 26/705
USPC .............. 219/121.67, 121.72, 121.76, 121.6, 219/121.63, 121.64, 121.68, 121.77, 219/121.82, 76.1
See application file for complete search history.

(56) References Cited

U.S. PATENT DOCUMENTS

| | | | |
|---|---|---|---|
| 2003/0006221 A1* | 1/2003 | Hong | H01L 21/3043 219/121.72 |
| 2009/0269206 A1* | 10/2009 | Yelistratov | B23K 26/342 219/76.1 |
| 2011/0018161 A1 | 1/2011 | Yang | |
| 2011/0089150 A1 | 4/2011 | Arjakine et al. | |
| 2014/0300064 A1 | 10/2014 | Inaba et al. | |
| 2015/0217414 A1* | 8/2015 | Luick | B23K 26/32 428/213 |
| 2017/0227408 A1* | 8/2017 | Helvajian | B29C 64/153 |
| 2017/0239751 A1 | 8/2017 | Luo et al. | |
| 2017/0282297 A1 | 10/2017 | Ohno | |
| 2019/0009370 A1* | 1/2019 | Matthews | B23K 26/0622 |
| 2019/0040503 A1 | 2/2019 | Martin et al. | |
| 2019/0134750 A1* | 5/2019 | Nauka | B23K 26/034 |

FOREIGN PATENT DOCUMENTS

| | | | | |
|---|---|---|---|---|
| CN | 105734562 | | 7/2016 | |
| CN | 109226755 A | * | 1/2019 | ............ B22F 12/00 |
| WO | 2005030484 | | 4/2005 | |

OTHER PUBLICATIONS

Indhu, Overview of Laser Absorptivity Measurement Techniques for Material Processing, Dec. 2018, Lasers in Manufacturing and Materials Processing (Year: 2018).*

Melting Point of Common Metals, Alloys, & Other Materials (Year: 2017).*

* cited by examiner

LASER SMOOTHING

TECHNICAL FIELD

The present disclosure is directed generally, but not by way of limitation, to methods for processing metal parts, and in particular, to performing a smoothing operation on laser cladding.

BACKGROUND

Additive manufacturing processes can be used to add material to an existing part. One such additive manufacturing process includes laser cladding. Laser cladding involves providing a substrate material to a location proximate a surface of a part that the substrate material is to be bonded to. The substrate material is generally a powdered metal. In conjunction with providing the substrate material to the surface of the part, a laser beam that is also focused on the part converts the substrate material into an additive layer bonded to the surface of the part.

This aforementioned laser cladding process works fairly well for parts where the laser clad does not need to be machined. However, laser cladding is very difficult, if not impossible, to machine and therefore cannot be used in many applications. Laser cladding results in a material with a high hardness and an irregular surface which makes machining a challenge. In some situations, machining inserts used to machine the surface become instantly chipped and must be replaced. Due to these challenges, laser cladding cannot be used to add material to certain parts or to repair them after a portion of the part is worn away with use. One example of a part that has not suitable for laser cladding repair is a tappet, such as is used in a fuel system. Because tappets have surface tolerance requirements that require machining to be performed, laser cladding has not been a suitable additive manufacturing process for repairing tappets. Without a suitable process for repairing tappets they are generally scrapped at their end of life instead of being repaired.

Thus, there is a need to improve the machinability of laser cladded surfaces, including parts that are repaired using laser cladding. There is also a particular need for improvements in the ability to repair tappets using an additive manufacturing process to restore the material eroded from a worn surface.

One attempt to address the issue of machining laser cladded components is described in U.S. Pat. No. 10,067,494 to Chen et al. and issued on Sep. 4, 2018. The '494 patent describes a hybrid computer numerical control machining center for cutting, laser cladding and surface heat treating a work-piece in a single machine so that the work-piece does not have to be moved between different machines. While the '494 patent reduces the need to move a work-piece between different types of machines, the '494 patent fails to improve machinability of a laser cladded surface, and fails to improve the repairability of certain components, such as tappets (e.g., tappets in a diesel fuel system).

Another attempt to address the issue of machining laser cladded components is described in U.S. Patent Publication No. 2017/0239751 to Luo et al. and issued on Aug. 24, 2017. The '751 publication describes a remanufacturing method for a metal part that combines a process of laser cladding and large-area overlapped laser shot peening to repair a groove. However, the '751 publication fails to improve the machinability of a laser cladded surface, and fails to improve the repairability of certain components, such as tappets.

The present disclosure is directed to overcoming one or more of the shortcomings set forth above and/or other shortcomings in the art.

SUMMARY

In one aspect, the present disclosure relates to a method of additive manufacturing. The method can include providing a substrate material at a location proximate a surface of a part and forming the substrate material into an additive layer on top of the surface by exposing the substrate material to a first laser beam having a first power level. Following formation of the additive layer, the method can include cooling the additive layer from a first temperature reached at the completion of the forming step to a second temperature. With the additive layer reduced to the second temperature, the method can include exposing the additive layer to a second laser beam having a second power level. The second power level can be lower than the first power level.

In another aspect, the present disclosure relates to a tappet repaired by a process including providing a substrate material at a location proximate a surface of the tappet and forming the substrate material into an additive layer on top of the surface by exposing the substrate material to a first laser beam having a first power level. Following formation of the additive layer, the method can include cooling the additive layer from a first temperature reached at the completion of the forming step to a second temperature. With the additive layer reduced to the second temperature, the method can include exposing the additive layer to a second laser beam having a second power level. The second power level can be lower than the first power level.

In yet another aspect, the present disclosure relates to a method of smoothing a laser clad surface. The method can include providing, receiving or manufacturing a part having a laser clad portion, and exposing at least a portion of the laser clad portion to a laser beam configured to smooth a surface layer of the laser clad portion.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Various examples of forming and repairing parts using laser cladding and performing smoothing operations on laser cladding will now be described. Examples described in this disclosure improve the machinability of laser cladded surfaces by performing a smoothing operation on the laser cladded surface. The addition of the smoothing operation makes it possible to repair and re-use components such as tappets, that are generally discarded at the end of their useful life.

Reference will now be made in detail to embodiments of the disclosure, examples of which are illustrated in the accompanying drawings. Relative terms, such as, "substantially", "about" and "approximately" are used to indicate a possible variation, for example, of ±10% in a stated numeric value. As defined herein, the use of the terms "or" or "and" includes "or", "and" or "and/or".

Figure 1:
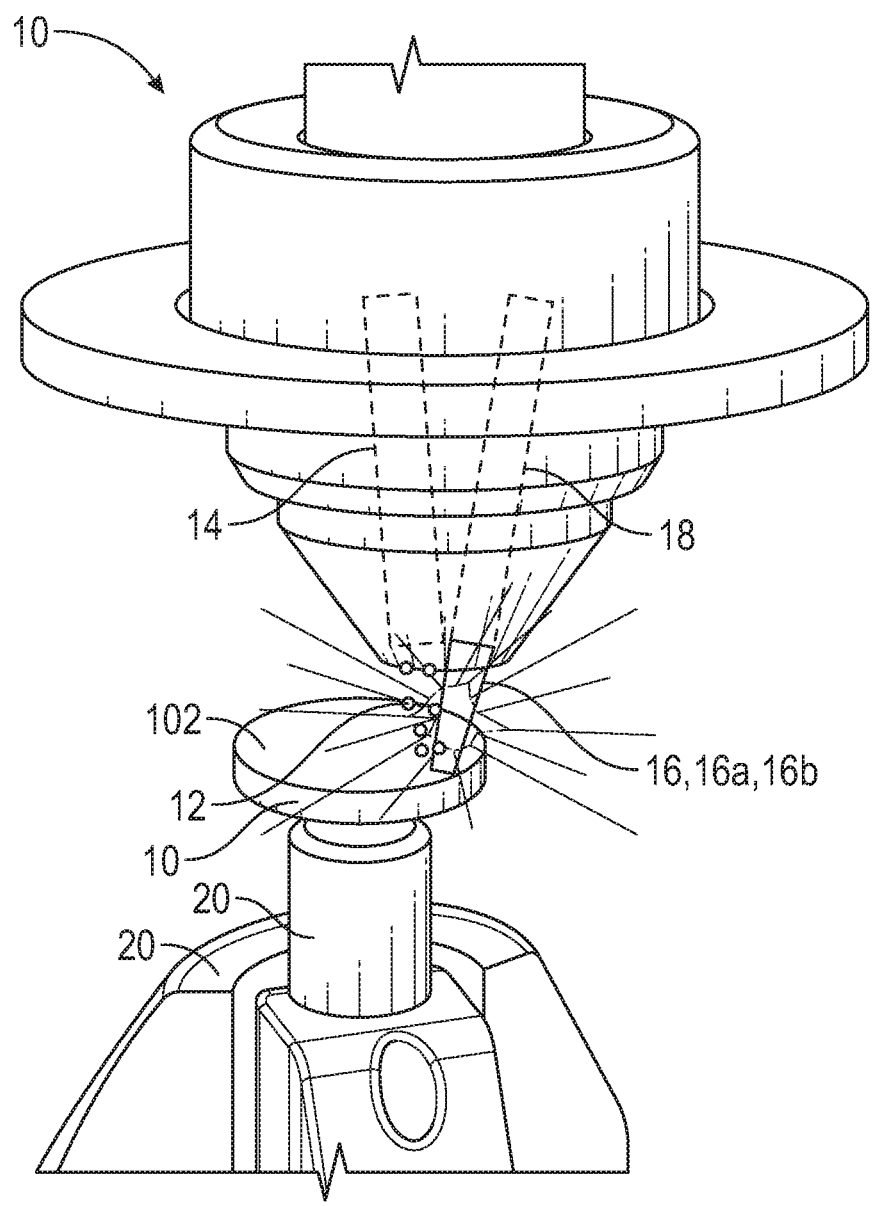
FIG. 1 is a side perspective view of a tappet positioned proximate a laser cladding head, in accordance with at least one example.

FIG. 1 illustrates an example of an additive manufacturing process such as laser cladding being performed on a part by a laser cladding machine 10. In the example, the part is shown as a tappet 100 with the tappet held in a fixture 20. The tappet 100 can be of the type that that is used in some fuel systems. The tappet 100 can include a cam interface surface 102 for interfacing with a rotating cam. When assembled into the fuel system, the cam interface surface 102 of the tappet 100 is located in contact with the rotating cam as is known in the art. As the cam is rotated, the cam interface surface 102 receives motion from the cam to move tappet 100 linearly. Movement of the tappet 100 contributes to timing of the fuel system. To achieve proper timing and movement, the cam interface surface 102 of the tappet 100 require surfaces that are machined to a particular tolerance. However, over time, as the cam interface surface 102 becomes worn away, the tappet 100 may no longer function as intended and must be repaired or replaced.

A laser cladding process as shown in FIG. 1, is used for adding one material to the surface of another material in a controlled manner (e.g., a type of additive manufacturing). Laser cladding can be used for various reasons. Because laser cladding beneficially creates a strong bond with the part and provides a very hard surface, it can be used to repair worn or damaged parts. Laser cladding can be used to replace material that was worn away on a metal part during use. However, laser cladding has limitations that limit its use for repairing a tappet (e.g., 100).

During laser cladding, a substrate material 12 such as a powder is fed through a material delivery channel 14 to a laser beam 16 that is scanned across a surface that the substrate material 12 is to be deposited onto. The laser beam 16 can be generated by laser 18. In the example of FIG. 1, the surface is the cam interface surface 102 of the tappet 100. The laser cladding process leaves behind an additive layer 110 (e.g., a deposited coating) of the substrate material 104 on the cam interface surface 102. While the laser cladding process and smoothing operations are described herein with respect to repairing the tappet 100, the examples described herein may be applied to other parts. The methods, including portions of the methods, can be used to create, modify or repair other parts.

Figure 2:
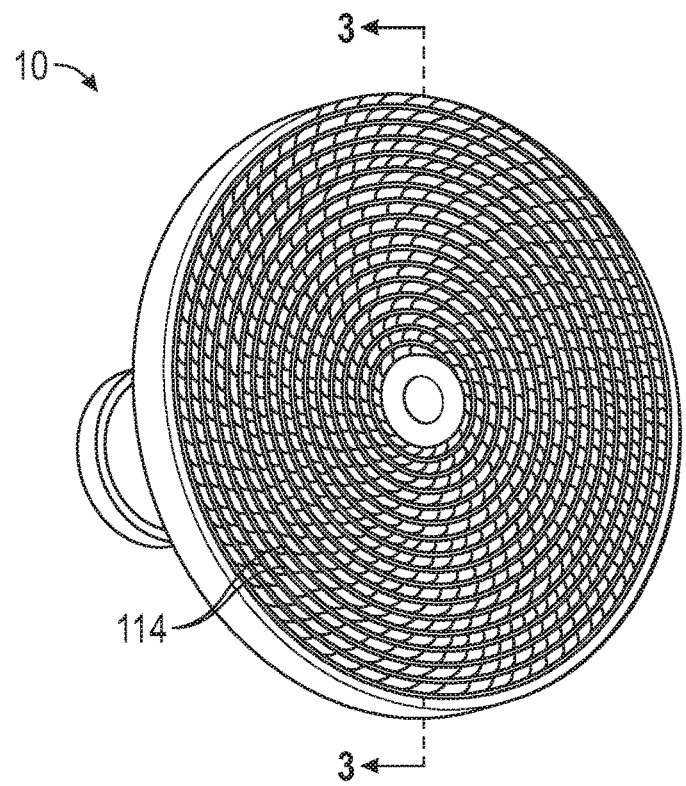
FIG. 2 is a perspective view of the tappet of FIG. 1 including an additive layer formed by laser cladding, in accordance with at least one example.

FIG. 2 illustrates an illustrative tappet 100 including the additive layer 110 formed by the laser cladding process of FIG. 1. The additive layer 110 replaces material that was worn off during use so that the tappet 100 can be repaired and reused. The tappet 100 is merely provided as an example of a part for which laser cladding an additive layer 110 onto the part presents post-cladding machining challenges, and for which challenges are solved by the methods described herein.

Dining laser cladding, the laser 18 can be pulsed at a first power level such that the laser 18 is turned on for a portion of time and then shut off for a portion of time in a very fast repeated manner generating a first laser beam 16a. In an example, the first laser beam 16a can include the laser 18 being pulsed at a first power level of about 3000 watts with the laser 18 alternating between being turned on for 1 msec and the shut off for 8 msec. A benefit of pulsing the laser 18 rather than leaving the laser 18 on continuously is that it provides enough power for the laser cladding operation to occur, but interrupts the heat being delivered to the part and thus prevents the part from becoming overheated. This is helpful in the case of a tappet 100, which is a small part that heats up quickly and would be at risk of melting if the laser was left on continuously.

Unfortunately, while pulsing the laser 18 prevents part melting, the pulsing process also creates a rough outer surface 112a (FIG. 3) that is extremely difficult to machine. As described herein, tappets 100 require a smooth surface that is machined to a particular tolerance in order to interface with other parts such as a cam in a fuel system. Therefore, laser cladding has not been a suitable method for repairing certain parts, including but not limited to, the tappet 100.

Figure 3:
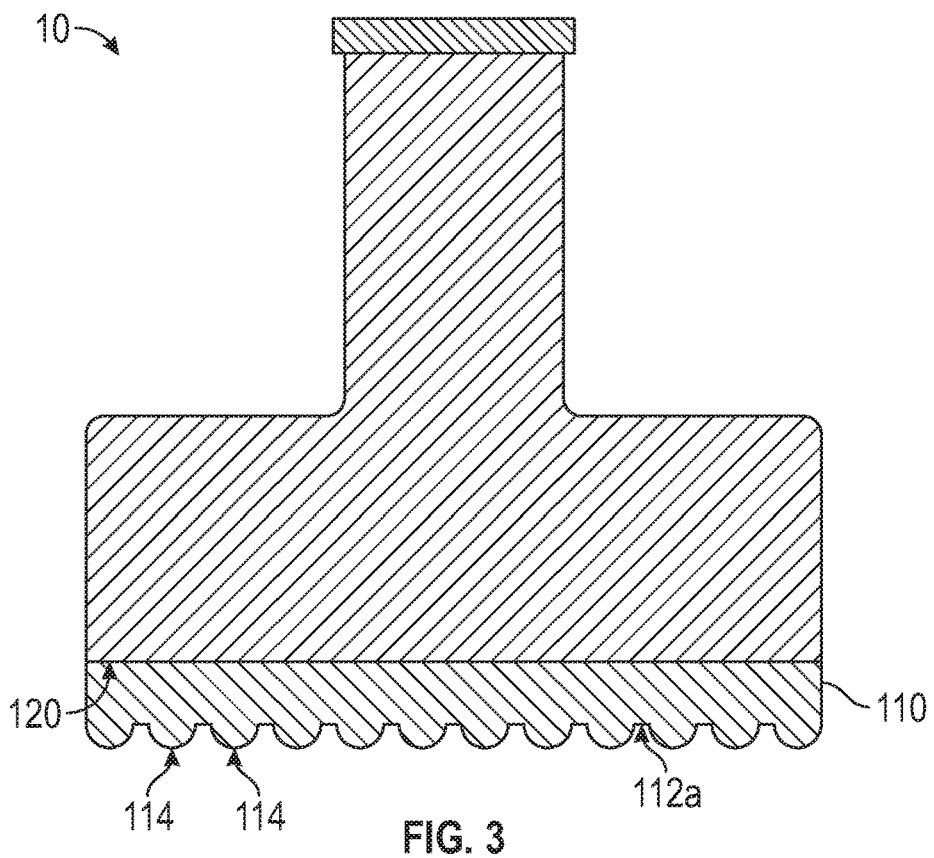
FIG. 3 is a cross section of a portion of the tappet of FIG. 2, taken along line 3-3, in accordance with at least one example.

The rough outer surface 112a produced by the laser cladding process can be described as an interrupted surface. As shown in FIGS. 2 and 3, these interruptions 114 along the outer surface 112a occur repeatedly along the path that the laser 18 traveled to form the additive layer 110. Each time the laser 18 is turned from on to off or off to on, an interruption 114 is formed. Attempts to machine this rough outer surface 112a can result in damage to cutting tools (e.g., cutting inserts for a lathe). The damage is caused by the shock induced in the cutting tool when the insert hits an interruption 114 and because the microstructure of the laser clad surface (e.g., additive layer 110) being cut has a high hardness value. The hardness value of the additive layer 110 can be higher than the hardness of the tappet 100, or other part, to be repaired.

FIG. 3 shows a cross section of a portion of the tappet of FIG. 2, taken along line 3-3. The cross section shows the tappet 100 including a worn surface 120 and the additive layer 110 formed over the worn surface 120 by laser cladding. As depicted in the cross section, the laser cladding causes the additive layer to have the rough outer surface 112a including the interruptions 114 created when the laser 18 is pulsed on and off.

Figure 4:
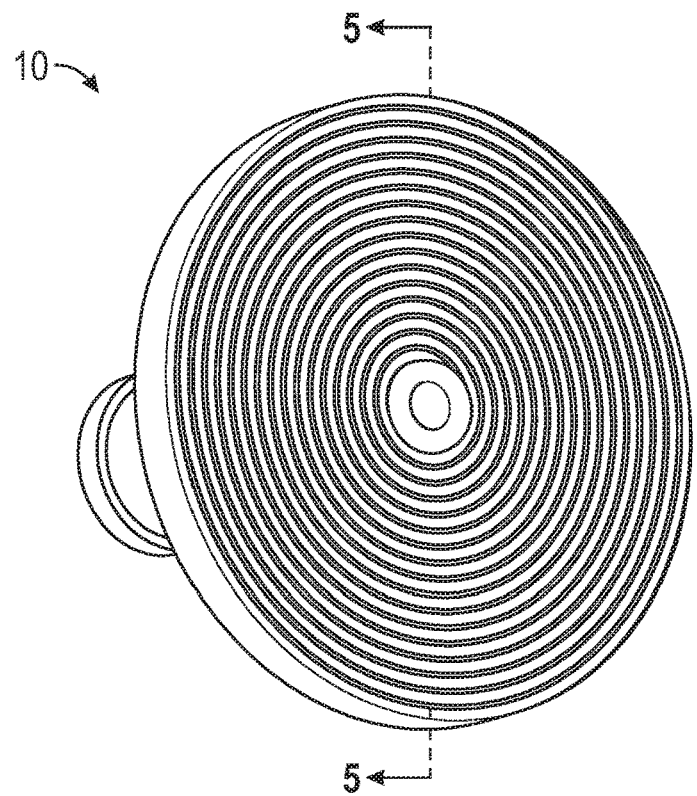
FIG. 4 is a perspective view of the tappet of FIG. 2 after a laser smoothing operation, in accordance with at least one example.

FIG. 4 shows an example of the laser cladded tappet 100 of FIG. 2, but after it has undergone a laser smoothing operation. After the laser cladding operation is performed, but before the laser smoothing operation is performed, the laser cladded tappet 100 is cooled. Cooling can be provided intentionally such as by exposing the tappet 100 to a cooling source, or by allowing the tappet 100 to simply cool due to the ambient room temperature being lower the temperature of the tappet 100. The tappet 100 can be cooled until the additive layer 110 (e.g., at least portion of the additive layer) reaches a second temperature that is lower than a first temperature that was reached at the completion of the laser cladding step. In some examples, the first temperature can be in a range between 100-120 degrees Celsius, and the second temperature can be in a range between 5-25 degrees Celsius. In a possibly preferred example, the second temperature can be approximately 20 degrees Celsius. A variety of first and second temperature combinations are possible depending on the application. In some examples, the second temperature can be in a range between 70-75% lower than the first temperature. In a possibly preferred example and for a particular part which may include the tappet 100, the first temperature can be in a range between 90-100 degrees Celsius and the second temperature can be in a range between 5-15 degrees Celsius. In a possibly preferred example the second temperature can be approximately 10 degrees Celsius.

With the tappet 100 in the second temperature range, the laser smoothing operation can performed by exposing the additive layer 110 to a second laser beam 16b (e.g., FIG. 1) having a second power level that is lower than the first power level. In some examples, the first and second laser beams (16a, 16b) can be provided by the same laser 18 (FIG. 1). For example, the tappet 100 can be laser cladded by the laser cladding machine of FIG. 1, and the tappet 100 can be removed from the laser cladding machine 100. Then, the tappet 100 can be cooled to the second temperature. In some examples, while the tappet 100 cools, the laser cladding machine 10 can be used to laser clad another tappet 100 (or another part). After the tappet 100 has reached the second temperature, the tappet 100 can be re-inserted into the laser cladding machine 10 to perform the smoothing operation. However, in the smoothing operation, and in contrast to the cladding operation, the tappet 100 is exposed to the laser 18 at the second power level (e.g., second laser beam 16b, FIG. 1) and without providing any substrate material 12. In some examples the second laser beam 16b is a continuous (e.g., substantially continuous, mostly continuous, more continuous) laser beam having a lower power than the first laser beam 16a. In some examples, the first power level 16a can be in a range between 750-2000 Watts. In some examples, such as for the illustrative tappet 100, the second power level 16b can be in a range between 900-1100 Watts. In some examples the second power level 16b can be in a range between 70-75% lower than the first power level 16a, or in a possibly preferred example, approximately 70% lower. In some examples, the second laser beam 16b may not be a continuous laser beam but may be a lower power level and pulsed at a lower pulse rate than the first laser beam 16a in the laser cladding operation.

In some examples, the first and second laser beams 16a, 16b can be provided by the same laser 18 on the same machine 10. In some examples, the first and second laser beams 16a, 16b can be provided by different lasers, and even different machines.

The second laser beam 16b can be configured to treat the additive layer 110 produced by the laser cladding operation of FIG. 2 and form at least a portion of the additive layer 110 into a smoother, more machinable layer, as shown in the example of smoothed outer surface 112b in FIG. 4.

Figure 5:
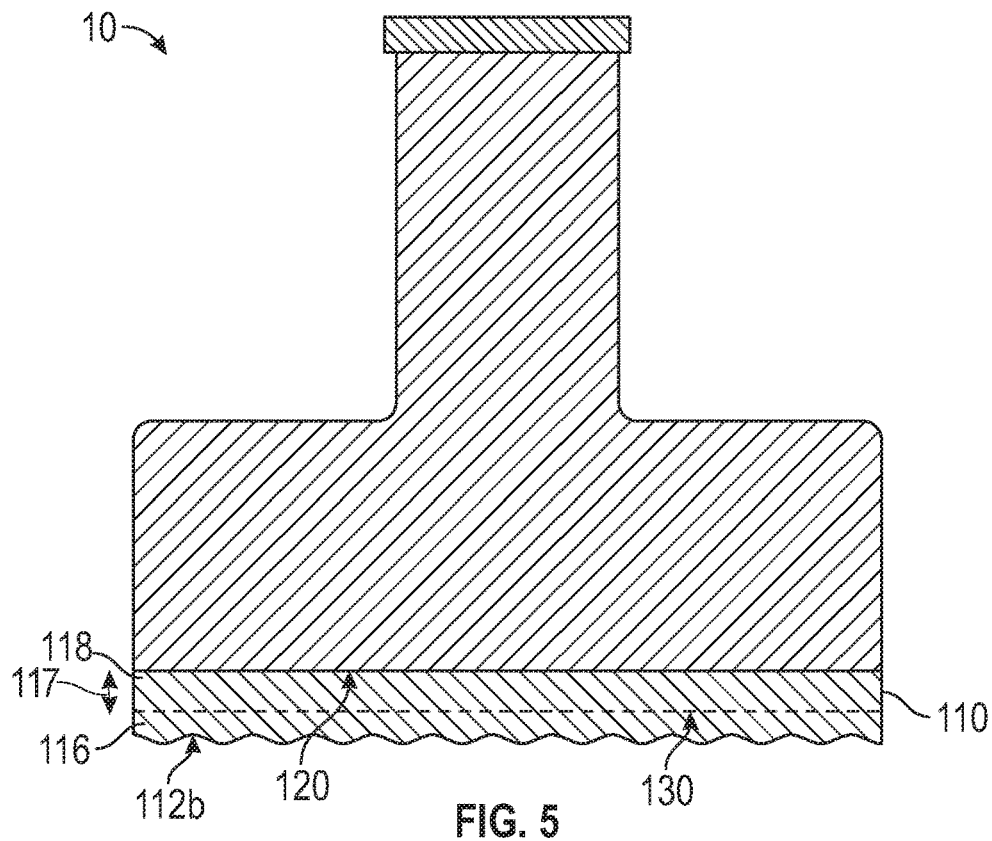
FIG. 5 is a cross section of a portion of the tappet of FIG. 4, taken along line 5-5, in accordance with at least one example.

FIG. 5 shows a cross section of a portion of the tappet 100 of FIG. 4, taken along line 5-5, the cross section shows a tappet 100 including a worn surface 120 and the additive layer 110 formed by laser cladding, but with the rough outer surface 112b of the additive layer 110 smoothed by the smoothing operation. The smoothing operation can cause the microstructure of an outer layer 116 of the additive layer 110 to change while leaving a remaining layer underneath unaltered or less altered.

One of the benefits of the smoothing operation is that it results in a tappet 100 having an outer layer 116 that is smoother than the raw laser clad surface of FIG. 2. This smoother outer layer 116 can be more easily machined off than a rough raw laser clad surface. The remaining layer 118 provides a beneficial durable cam interface surface 102 for the tappet 100, machined to a specified tolerance that can be suitable for interfacing with a cam in a fuel system.

In some examples, the smoothing operation does not substantially affect the hardness of the outer layer 116 of the additive layer 110. For example, prior to exposing the additive layer 110 to the second laser beam 16b, the additive layer 110 can include an outer layer 116 having a first hardness in a range between 64-66 HRC and having a first surface roughness including interruptions produced by laser cladding. After exposing the additive layer 110 to the second laser beam 16b the outer layer 116 can include a second hardness in a range between 64-66 HRC, and a second surface roughness with less prominent interruptions. In other words, the second surface roughness can be less abrasive than the first surface roughness.

The example smoothing operation described herein with respect to smoothing a tappet 100 can also be employed to smooth other laser clad surfaces or parts. Examples of other parts that can employ the methods described herein include, but is not limited to, camshafts, crankshafts, water pump shafts, fuel injector cases and pistons. In some examples, the smoothing operation can be performed completely separate from, on a different machine, at a different facility and at different times than the laser cladding operation.

Figure 6:
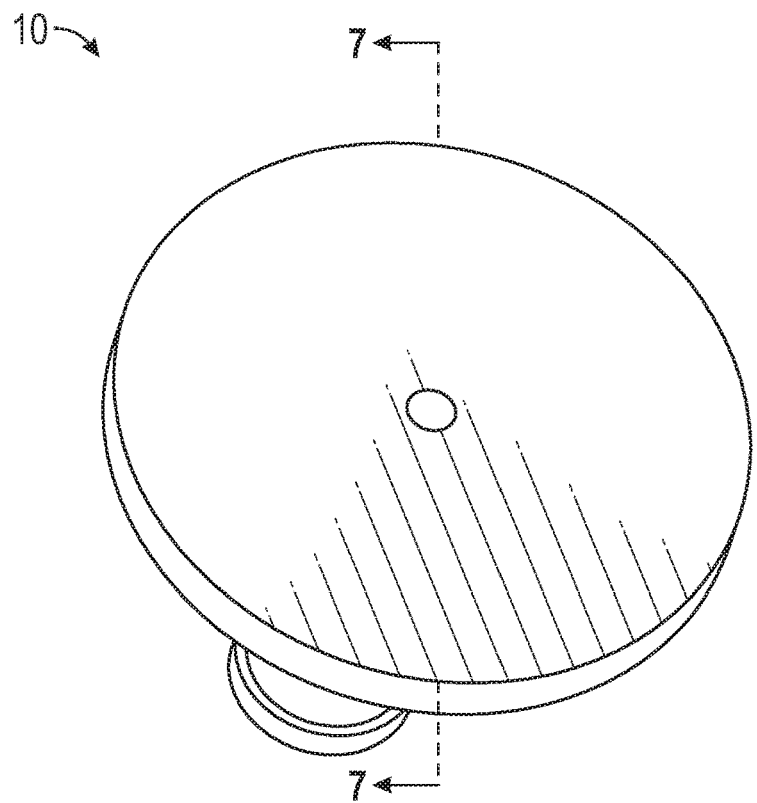
FIG. 6 is a perspective view of the tappet of FIG. 4 after a machining operation, in accordance with at least one example.
Figure 7:
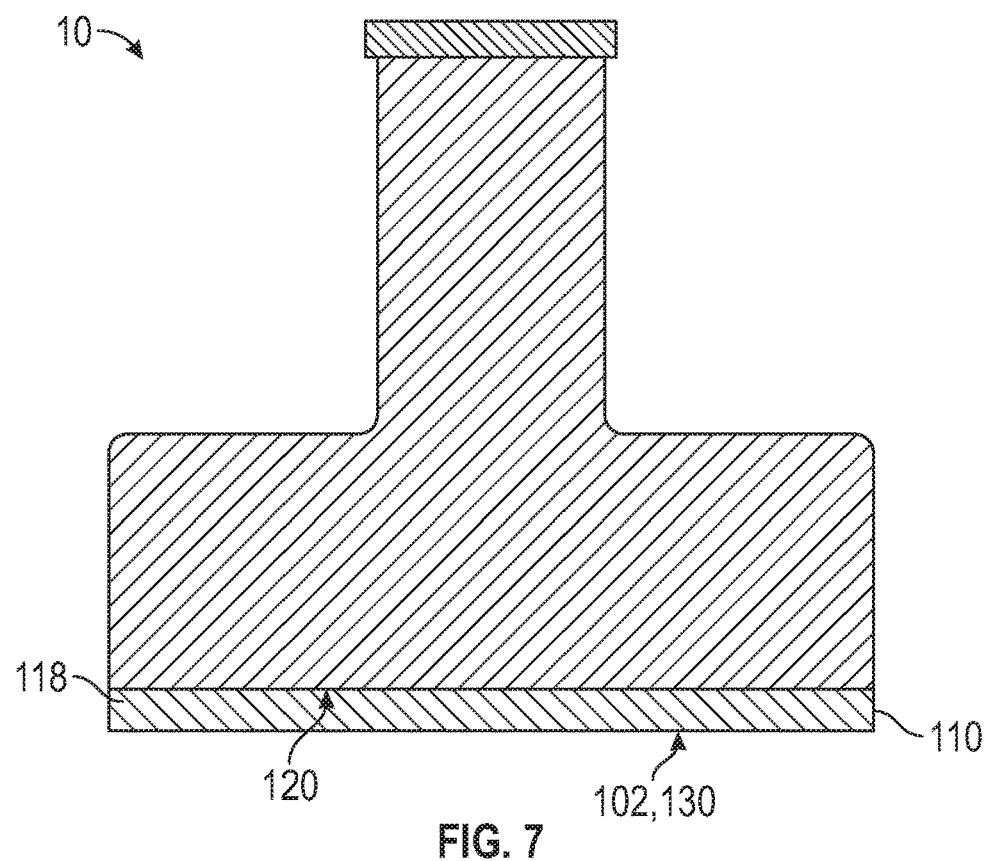
FIG. 7 is a cross section of a portion of the tappet of FIG. 6, taken along line 7-7, in accordance with at least one example.

FIG. 6 shows an example of a tappet 100 having a machined outer surface 130 after it has undergone the laser cladding operation described with respect to FIGS. 2 and 3 and the laser smoothing operation as described with respect to FIGS. 4 and 5, as well as a machining operation to remove at least a portion of the additive layer. FIG. 7 shows a cross section of a portion of the tappet 100 of FIG. 6, taken along line 7-7. The cross section shows the worn surface 120 and the additive layer 110 formed by laser cladding, but with the smoothed outer surface 112b of the additive layer 110 removed by machining.

Suitable machining processes for machining off a portion of additive layer 110 of the tappet 100 can include using a lathe, or other machine such as a grinder or milling machine. Any other suitable machining operation can be performed depending on the size, geometric and tolerance requirements for the part.

INDUSTRIAL APPLICABILITY

In general, the foregoing disclosure finds utility in various industrial applications, such as, in repairing tappets. The method of smoothing a laser clad surface herein may provide for improved machinability of the laser clad surface such that tappets and other components can be repaired and reused rather than being scrapped at the end of their life.

Figure 8:
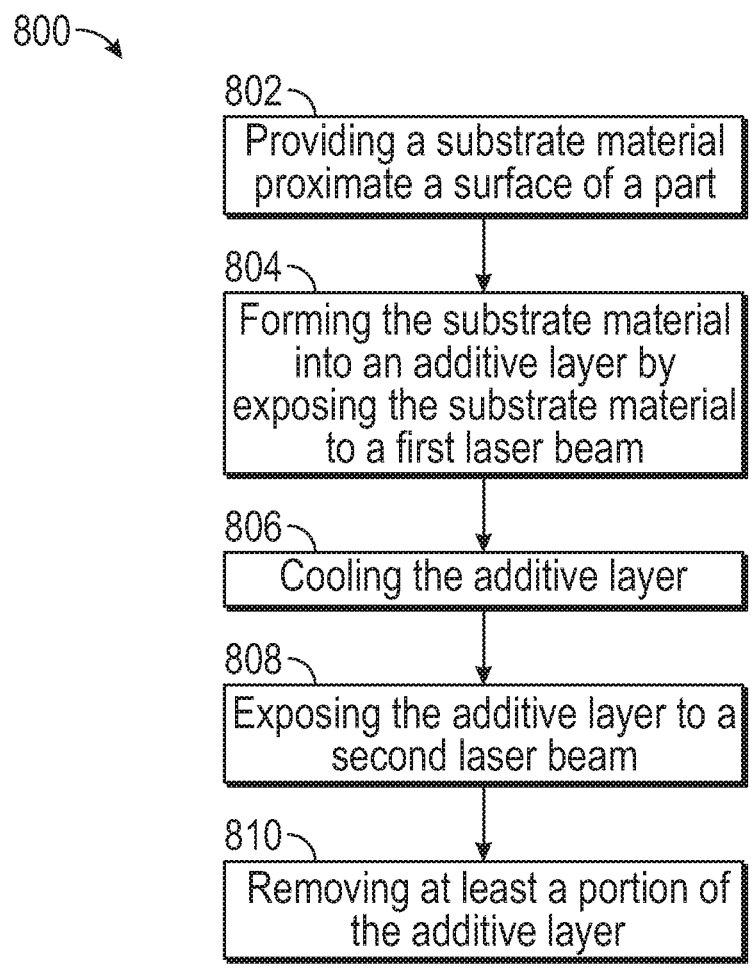
FIG. 8 is a flow chart illustrating a process of repairing a tappet, in accordance with at least one example.

FIG. 8 illustrates a method 800 of laser smoothing a laser cladded part. One such part that the method 800 can be performed on includes a tappet 100 as shown and described previously with respect to FIGS. 1-7. For example, over time and with use, parts of a fuel system, such as the tappet 100, can become worn or damaged and may need to be replaced or repaired. When the tappet 100 becomes worn, generally it is a cam interface surface 102 of the tappet 100 that is worn away. Rather than scrapping the tappet 100, a portion of the tappet 100 that is worn away can be added back by a process of laser cladding and laser smoothing.

The method 800 enables parts, such as a tappet 100, that were previously thrown away, to be salvaged, repaired and reused, thereby reducing cost.

Through a process of additive manufacturing, such as laser cladding, the method 800 can include in step 802, providing a substrate material 12 proximate a worn surface 120 of the tappet 100 to be laser cladded. The substrate material 12 can include a powder suitable for bonding and forming a metal layer onto a metal tappet.

Step 804 can include forming the substrate material 12 into an additive layer 110 by exposing the substrate material 12 to a first laser beam 16a. In some examples, the first laser beam 16a is a pulsed laser beam having a first power level that, along with beneficially forming the additive layer 110, creates machining challenges due to the hard interruptions 114 it leaves across a rough outer surface 112a of the additive layer 110. These interruptions 114 are difficult to machine.

Step 806 can include cooling the additive layer 110 to reduce the additive layer 110 from a first temperature reached at the completion of the forming step 804, to a second temperature that is less than the first temperature. In some examples, cooling the additive layer 110 can be accomplished by allowing the tappet 100 to cool under exposure to ambient temperature (e.g., removed from the laser cladding machine 10 and left to cool outside the machine 10). The additive layer 110 can be cooled to ambient temperature or to a value between the first temperature and ambient temperature, or to a temperature below ambient temperature. In some examples, rather than simply allowing the tappet 100 to cool at room temperature, technology can be employed to cool the additive layer 110, such as by employing convection, conduction or radiation. In some examples, the use of a chill chamber, a fan, or quenching the tappet 100 in a fluid may be used to reduce the temperature more rapidly. The tappet 100 can be cooled without being removed from the laser cladding fixture 20, or may be removed during cooling so that the fixture 20 can be used, for example, to laser clad other tappets or other parts while the additive layer is cooling.

Step 808 can include performing a smoothing operation by exposing the additive layer 110 to a second laser beam 16b. In some examples, the second laser beam 16b is a substantially continuous laser beam having a second power level that is lower than the first power level.

Step 810 can include removing a portion of the additive layer 110. The portion of the additive layer 110 to be removed can include the smoothed outer surface 112b, leaving behind a remaining layer 118 that serves as a new cam interface surface 102 for the tappet 110. Step 810 can include removing a portion of the additive layer 110 using a machining process capable of producing a specified roughness and tolerance.

It will be apparent to those skilled in the art that various modifications and variations can be made to the disclosed laser smoothing operation. Other embodiments will be apparent to those skilled in the art from consideration of the specification and the practice of the disclosed process. It is intended that the specification and examples be considered as exemplary only, with a true scope being indicated by the claims and their equivalents.

What is claimed is:

1. A method of additive manufacturing, the method comprising:
    providing a substrate material at a location proximate a cam interface surface of a fuel system tappet;
    forming the substrate material into an additive layer on top of the cam interface surface by exposing the substrate material to a first laser beam having a first power level;
    cooling the additive layer from a first temperature reached at the completion of the forming step to a second temperature;
    performing a smoothing operation by exposing the additive layer to a second laser beam having a second power level, wherein the second power level is lower than the first power level; and
    performing a machining operation, which is a separate operation from the smoothing operation, wherein the machining operation includes removing a portion of the additive layer.

2. The method of claim 1, wherein exposing the additive layer to the second laser beam includes exposing the additive layer to a continuous second laser beam having a power in a range between 900-1100 Watts.

3. The method of claim 1, wherein the second power level is in a range between 70-75% lower than the first power level.

4. The method of claim 1, wherein the second temperature is in a range between 70-75% lower than the first temperature.

5. The method of claim 1, wherein the step of exposing the additive layer to the second laser beam does not include adding the substrate material.

6. A part having an outer layer formed by the method of claim 1.

7. A method of additive manufacturing, the method comprising:
    providing a substrate material at a location proximate a surface of a part;
    forming the substrate material into an additive layer on top of the surface by exposing the substrate material to a first laser beam having a first power level;
    cooling the additive layer from a first temperature reached at the completion of the forming step to a second temperature; and
    exposing the additive layer to a second laser beam having a second power level, wherein the second power level is lower than the first power level;
    wherein prior to exposing the additive layer to the second laser beam the additive layer includes an outer layer having a first hardness in a range between 64-66 HRC and having a first surface roughness including interruptions produced by laser cladding, and wherein after exposing the additive layer to the second laser beam the outer layer has a second hardness in a range between 64-66HRC, and a second surface roughness with less prominent interruptions, and wherein the second surface roughness is less abrasive than the first surface roughness.

8. A tappet repaired by a process comprising:
    providing a substrate material at a location proximate a surface of the tappet;
    forming the substrate material into an additive layer on top of the surface by exposing the substrate material to a first laser beam having a first power level;
    cooling the additive layer from a first temperature reached at the completion of the forming step to a second temperature;
    performing a smoothing operation by exposing the additive layer to a second laser beam having a second power level, wherein the second power level is lower than the first power level; and performing a machining operation, which is a separate operation from the smoothing operation, wherein the machining operation includes removing a portion of the additive layer.

9. The tappet of claim 8, wherein the first laser beam is a pulsed laser beam, and wherein the second laser beam is a continuous laser beam.

10. The tappet of claim 8, wherein the second temperature is in a range between 70-75% lower than the first temperature.

11. The tappet of claim 8, wherein the second power level is in a range between 70-75% lower than the first power level.

\* \* \* \* \*